United States Patent
Herbert et al.

(10) Patent No.: US 8,852,368 B2
(45) Date of Patent: Oct. 7, 2014

(54) POLYOLEFIN COATED FABRIC REINFORCEMENT AND CEMENTITIOUS BOARDS REINFORCED WITH SAME

(75) Inventors: Charles G. Herbert, Shrewsbury, MA (US); Pranjal Shah, Nashua, NH (US)

(73) Assignee: Saint-Gobain ADFORS Canada, Ltd., Grand Island, NY (US)

( * ) Notice: Subject to any disclaimer, the term of this patent is extended or adjusted under 35 U.S.C. 154(b) by 189 days.

(21) Appl. No.: 12/869,143

(22) Filed: Aug. 26, 2010

(65) Prior Publication Data

US 2010/0319832 A1 Dec. 23, 2010

Related U.S. Application Data

(62) Division of application No. 12/335,937, filed on Dec. 16, 2008, now Pat. No. 7,803,723.

(51) Int. Cl.
| | |
|---|---|
| *B32B 38/18* | (2006.01) |
| *B28B 19/00* | (2006.01) |
| *B28B 23/00* | (2006.01) |
| *B29C 47/00* | (2006.01) |
| *C03C 25/10* | (2006.01) |
| *B29C 47/02* | (2006.01) |
| *B29K 23/00* | (2006.01) |
| *B29K 25/00* | (2006.01) |

(52) U.S. Cl.
CPC ........... *B28B 19/0092* (2013.01); *B29C 47/025* (2013.01); *B29K 2023/12* (2013.01); *B29K 2313/00* (2013.01); *B29K 2025/00* (2013.01); *B29K 2223/12* (2013.01); *B28B 23/0006* (2013.01); *B29C 47/0021* (2013.01); *C03C 25/1095* (2013.01); *B29K 2023/06* (2013.01)
USPC ...................................... 156/44; 156/244.11

(58) Field of Classification Search
USPC ................................................ 156/44, 244.11
See application file for complete search history.

(56) References Cited

U.S. PATENT DOCUMENTS

| | | |
|---|---|---|
| 3,600,269 A | 8/1971 | Daniels et al. |
| 4,460,633 A | 7/1984 | Kobayashi et al. |

(Continued)

FOREIGN PATENT DOCUMENTS

| | | |
|---|---|---|
| GB | 772581 | 4/1957 |
| JP | 05147989 | 6/1993 |

(Continued)

OTHER PUBLICATIONS

Beren, J.R.; *Heterophasic polypropylene copolymer resins for extrusion coating*, Polymer, Laminations and Coatings Conference 1994, pp. 102-112 (1994).

(Continued)

*Primary Examiner* — Elizabeth Cole
(74) *Attorney, Agent, or Firm* — Abel Law Group, LLP; Robert N. Young

(57) ABSTRACT

The present invention provides a method making glass fiber fabric reinforcements, cement boards, and glass fiber coatings for such reinforcements. The glass fiber fabric reinforcement includes a glass fabric containing multiple yarns containing glass filaments and a polymeric coating disposed onto the multiple yarns to form a coated glass fabric. The polymeric coating comprises a polyolefin based copolymer composition whereby the glass fabric has a Gurley Stiffness measurement of about 100-3000 mg and an ASTM D 638 (2% Secant) modulus of compression of about 1-100 MPa. The reinforcement is sufficiently drapable and lacking in shape memory so as to be curved around the edge of a cement board during the manufacture of same.

10 Claims, 4 Drawing Sheets

(56) References Cited

U.S. PATENT DOCUMENTS

| | | |
|---|---|---|
| 4,504,335 A | 3/1985 | Galer |
| 4,532,275 A | 7/1985 | Aito et al. |
| 4,535,015 A | 8/1985 | Bruner et al. |
| 4,578,301 A | 3/1986 | Currie et al. |
| 4,581,275 A | 4/1986 | Endo et al. |
| 4,640,864 A | 2/1987 | Porter |
| 4,647,496 A | 3/1987 | Lehnert |
| 4,916,004 A | 4/1990 | Ensminger |
| 5,038,555 A | 8/1991 | Wu et al. |
| 5,154,965 A | 10/1992 | Rouhling |
| 5,648,169 A | 7/1997 | Thimons et al. |
| 5,792,713 A | 8/1998 | Scari et al. |
| 5,961,684 A | 10/1999 | Moireau et al. |
| 6,054,205 A | 4/2000 | Newman et al. |
| 6,391,131 B1 | 5/2002 | Newman et al. |
| 6,579,413 B1 | 6/2003 | Grove |
| 6,716,774 B2 | 4/2004 | Porter et al. |
| 6,884,850 B2 | 4/2005 | Schauder et al. |
| 7,354,876 B2 | 4/2008 | Porter et al. |
| 7,435,694 B2 | 10/2008 | Kajander |
| 2002/0170648 A1 | 11/2002 | Dinkel |
| 2002/0182953 A1 | 12/2002 | Porter |
| 2002/0182954 A1 | 12/2002 | Porter |
| 2003/0051430 A1 | 3/2003 | Grove |
| 2004/0084127 A1 | 5/2004 | Porter |
| 2004/0150139 A1 | 8/2004 | Gregg et al. |
| 2004/0202810 A1* | 10/2004 | Peng ............................ 428/40.1 |
| 2004/0209060 A1 | 10/2004 | McGrady et al. |
| 2004/0224584 A1 | 11/2004 | Broadway |
| 2006/0188719 A1 | 8/2006 | Selivansky |
| 2006/0293424 A1 | 12/2006 | Tse et al. |
| 2007/0278717 A1 | 12/2007 | Novak et al. |

FOREIGN PATENT DOCUMENTS

| | | |
|---|---|---|
| JP | 10018543 | 1/1998 |
| JP | 11348160 | 12/1999 |
| JP | 2002155450 | 5/2000 |
| JP | 2002088614 | 3/2002 |
| JP | 2002302877 | 10/2002 |
| WO | WO 99/31025 | 6/1999 |

OTHER PUBLICATIONS

Marques, M.V; Poloponsky, M; Chaves, G.E; *Influence of the elastomeric polypropylene addition on the properties of commercial metallocenic polypropylene*, Mat. Res., 4,4, (2001).

Mascia, L; Dhillon, J; Harper, M.F; *Adhesions Enhancement of rubbery and ductile polyolefin coatings on glass fibers for epoxy composites and effects on failure mechanism*, Journal of Applied Polymer Science, 47,3, pp. 487-498, (1993).

Phillips, McHugh, Bradley, "High Performance Polypropylene Extrusion Coating Resins", Proceedings—1989 TAPPE Polymers Laminations and Coatings Conference, Orlando FL., Sep. 5-8, 1989.

International Search Report in PCT/US04/21551 dated Dec. 29, 2004.

International Search Report in PCT/US09/67909 dated Feb. 23, 2010.

* cited by examiner

POLYOLEFIN COATED FABRIC REINFORCEMENT AND CEMENTITIOUS BOARDS REINFORCED WITH SAME

CROSS-REFERENCE TO RELATED APPLICATIONS

This application is a Division of U.S. application Ser. No. 12/335,937, filed Dec. 16, 2008 now U.S. Pat. No. 7,803,723.

FIELD OF THE INVENTION

This invention relates to coated reinforcing fabrics, and more particularly to drapable fabric reinforcements for cementitious materials.

BACKGROUND OF THE INVENTION

Cementitious boards useful in the construction industry are known to contain inorganic, hydraulically setting material, such as Portland cement or gypsum. Hydraulic gypsum and cement, once set, have very little tensile strength and are usually reinforced with facing materials which improve the resistance to tensile and flexural loads. This has been the basis for using paper facing on conventional gypsum wall board and non-woven glass fiber scrim in cement boards.

Glass fiber meshes have been popular as a facing sheet in cement boards because they can increase the dimensional stability in the presence of moisture and provide greater physical and mechanical properties. However, most glass fiber compositions, other than AR glass, degrade in the alkali environment of a cement core, so they must be coated with a protective finish.

Cementitious boards have been manufactured by casting a hydraulic cement mixture in the form of a thin, indefinitely long panel. See U.S. Pat. No. 4,504,335, which is hereby incorporated by reference. The hydraulic cement is usually a mortar containing a mixture of water and Portland cement, sand, mineral or non-mineral aggregate, fly ash, accelerators, plasticizers, foaming agents and/or other additives. The mortar slurry is deposited onto a glass reinforcing network having a strippable paper sheet thereon, which is fed from a roll to pass over a forming table and under a continuous stream of mortar. The mortar is then distributed across the breadth of the carrier sheet, and the mortar-laden carrier sheet is towed through a slit defined by a supporting surface and a cylindrical mortar screeding roller mounted above the supporting surface so that its axis is transversely parallel to the supporting surface. The long network of reinforcing fibers is drawn against the roller and through the slit, rotating the roller counter to the direction of the travel of the carrier sheet, whereby the roller presses the network into the surface of the mortar and wipes mortar adhering to the roller into the interstices of the network. The network then tows the resulting broad, flat ribbon of mortar towards a cutter.

Similarly, British Patent Specification No. 772,581 teaches a production of reinforced plasterboard by a method which comprises spreading plaster on a first conveyor belt, dumping the plaster onto a plaster-soaked reinforcing mesh which is being transported by a second conveyor belt, and passing the plaster under a pressure roller to produce a ribbon of the required thickness. A second plaster-soaked mesh is dragged onto the upper surface of the ribbon as the mesh is fed under a third conveyor belt mounted above and in pressing relationship to the ribbon of plaster.

In still another process, as described in Lehnert et al., U.S. Pat. No. 4,647,496, a randomly oriented fibrous glass mat is fed onto a continuously moving belt onto which gypsum slurry is poured. The top surface of the gypsum ribbon thus formed is layered with a second randomly oriented glass mat which forms a sandwich with the gypsum core and the lower glass mat.

Other fiber and coating technologies possibly useful in fabric reinforcements include those found in U.S. Pat. Appl. 2006/0188719 (now U.S. Pat. No. 7,045,209); U.S. Pat. Nos. 4,532,275 and 3,600,269; and Beren, J. R.; *Heterophasic polypropylene copolymer resins for extrusion coating*, Polymer, Laminations and Coatings Conference 1994, pp 102-112 (1994); Marques, M. V; Poloponsky, M; Chaves, G. E; *Influence of the elastomeric polypropylene addition on the properties of commercial metallocenic polypropylene*, Mat. Res., 4,4, (2001); and Mascia, L; Dhillon, J; Harper, M. F; *Adhesions Enhancement of rubbery and ductile polyolefin coatings on glass fibers for epoxy composites and effects on failure mechanism*, Journal of Applied Polymer Science, 47, 3, pp 487-498, (1993), which are hereby incorporated herein by reference in their entirety.

Woven knit and laid scrim fabrics used in cementitious boards may be coated either:

(a) before fabric-forming, as in single-end-coated fabrics;

(b) in-line (normally roller or dip coated) concurrently with formation such as in the case of laid scrim non-woven meshes; or (c) off-line coated after formation (normally roller or dip coated), typically used with many woven fabrics. In the case of coating before fabric-forming, the cost of coating each strand individually, in an operation prior to weaving, may be prohibitive. In the cases of in-line or off-line coating operations, the coating levels of the machine direction ("MD") and cross-machine direction ("CD") yarns are generally not independent.

Unequal coating levels between the MD and CD yarns, normally found in dip coated fabrics, results in an "imbalanced coating weight distribution ratio" in which more coating is deposited on the low tension CD yarns than on the relatively higher tension MD yarns. This "imbalance" often leads to undesirable properties of reinforcements especially those which have been treated or coated for corrosion or fire resistance. In corrosive environments, such as cement-based matrices, heavier coating in the CD implies lower, possible inadequate coating protection on the MD. Both quantity and quality of coating in the MD suffers. The tensioned, twisted MD bundle does not allow coating to penetrate within the bundle. As a result substantial pockets of air remain in the MD bundle. The poor quantity and quality of coating on the MD strands leads to poor corrosion protection of the MD strands relative to that of the CD strands, especially in an alkali environment like cement.

A balanced coating weight distribution is desirable. It is easy to achieve in the case of single-end-coated (SEC) fabrics as each strand is independently and explicitly coated with a given level of coating. The coated strands are then combined into a fabric with the ratio of coating weight ($DPU_{cd}/DPU_{md}$) being established simply by selection of yarns containing the desired coating weights-often selected to be the same in MD and CD.

Current glass scrim reinforcements typically include a coating of PVC plastisol, a blend of PVC particles dispersed in plasticizer (usually phthalate based). By necessity, such coatings contain heat stabilizers and varsol (or other paraffin oil based solvent) to control viscosity. Despite the presence of the heat stabilizer, it is not advisable to dry PVC at too high a temperature or it will de-polymerize. The phthalate plasticizer has also come under increased scrutiny for its VOC emissions. The solvent used to control viscosity also tends to evaporate during drawings and yields voids in the coating, leading to decreased alkali resistance in certain locations such that cement, being alkaline, will dissolve uncoated glass fiber surfaces.

The manufacturing plant will also need to burn off the solvent with an oxidizer. Since the plasticizer has some affinity for the PVC particles dispersed in it, it becomes more viscous over time as the plasticizer migrates into the PVC. This problem is exacerbated in the summer months when the manufacturing plant is much warmer. A plant chemist is required to adjust viscosity to compensate for evaporation using additional solvent. This can lead to some variability in coating quality and thickness. Often, batches of plastisol are lost when the viscosity goes too high. In the dip process, where an entire fabric is immersed in the plastisol while it is on the tenter frame, there is much more tension in the yarns in the machine direction than the yarns in the cross machine direction, so much more plastisol is picked in the cross machine direction yarns during coating, resulting in an imbalanced coating. This necessitates using an unnecessarily large amount of plastisol on the scrim so that the machine direction yarns are properly coated to get the same performance as the cross machine direction yarns.

Accordingly, there remains a need for woven, knit or mesh-type non-woven ("scrim") fabrics which have a uniform coating of an alkali-resistant material which is easily applied, and which generates less VOCs, but which is also drapable and strong, as well as methods for producing such coating on yarn for improving manufactured properties of cement boards, for example, and for protecting these fabrics in environments which require corrosion and flame resistance, for example.

SUMMARY OF THE INVENTION

In accordance with a first preferred embodiment of the present invention, a glass fiber fabric reinforcement is provided which includes a glass fabric containing multiple yarns containing glass filaments and a polymeric coating disposed onto the multiple yarns to form a coated glass fabric. The polymeric coating includes a polyolefin (such as a polypropylene or a polyethylene-based co-polymer composition). The coated glass fabric results in a Gurley Stiffness measurement of about 100-3000 mg and an ASTM D 638 (2% Secant) modulus of compression of about 1-100 MPa, the reinforcement being sufficiently drapable and sufficiently lacking in shape memory so as to be curved around the edge of a product to be reinforced, such as a polymer matrix, gypsum board, or cement board, during the manufacture of same.

The polyolefin-based compositions of this invention are much more heat stable than conventional PVC plastisol coatings so that they will not de-polymerize during exposure to heat. These polyolefin coatings are particularly advantageous for extruding filaments and yarns made of high strength material such as glass. The extrusion of polypropylene and polyethylene, in particular, avoids many of the negative issues associated with plasticizer, since the coating will always have the same viscosity and rheology at the same temperature. Predictably, there should be no voids in the polyolefin coatings of this invention, no solvent to be removed, a relatively uniform coating, and very little chance of having to scrap a batch of coating because the viscosity of the batch is not optimized. Furthermore, polyolefin extrusion coatings do not require phthalate plasticizer for flexibility, and do not require the use of stainless steel coated extruder parts, which are necessary in the making of PVC plasticizer, as HCl gas is given off in the process.

In further embodiments of the present invention, the polyolefin based polymer or copolymer composition is extruded, or otherwise single-end-coated (SEC), over individual yarns intended to be used in the resulting reinforcement fabric. Ideal polypropylene copolymer compositions include a heterophasic copolymer of polypropylene, or a blended mixture of polypropylene homopolymer and ethylene-propylene rubber.

In still a further embodiment of the present invention, a glass fiber coating composition is provided which comprises about 70-80 wt. % heterophasic polypropylene copolymer; about 10-30 wt. % polypropylene homopolymer; about 1-5 wt. % ethylene-olefin copolymer; about 2-4 wt. % maleic anhydride-g-polypropylene; about 0-20 wt. % inorganic filler and about 500-1500 ppm vinylidene fluoride-hexafluoroalkene copolymer.

The process used for coating PVC plastisol for glass scrims is to dip coat the scrim and dry the coating, which is relatively limiting from a production standpoint. The polyolefin coatings of the present invention are derived from a polymer melt using a preferred extrusion technology and hence, can be run at much higher line speeds. Polymer melts may have small traces of low molecular weight fractions; "solventless" or extremely low "VOC emissions" would also be appropriate. While one would think that one could replace dip-coating applications of PVC plastisol by extrusion coating directly onto glass yarns, plasticized PVC migrates out of the coating when aged at elevated temperatures, such as the curing temperature for cement board, thus making the thin extruded coating very brittle and vulnerable to cracking. The present invention employs little or no plasticizer or low molecular weight additives, such as mineral oils or solvents, in preparing its "soft" polyolefin copolymer compounds. The present invention also takes advantage of compatible sizes for polypropylene, which have been developed for polypropylene reinforced composites.

In a further embodiment of the present invention, a cement board is provided which includes a cement matrix and a glass fabric containing glass filaments. At least the yarns and the glass fabric are coated with a polymeric coating composition comprising a polyolefin composition resulting in a Gurley Stiffness measurement of about 100-3000 mg and an ASTM D 638 (2% Secant) modulus of compression of about 1-100 MPa. The coated glass fabric is embedded into at least one surface of the somewhat viscous cement board, such that the glass fabric is sufficiently drapable so as to be curved around an edge of the product to be reinforced, during the manufacturing of same, without significantly springing back into its original form. The polymeric coating is desirably applied in a thickness of about 0.04-1.0 mm, preferably about 0.4-0.7 mm, and most preferably about 0.5-0.55 mm.

A BRIEF DESCRIPTION OF THE DRAWINGS

The present invention will be further described with reference to the following drawings.

DEFINED TERMS

Figure 1:
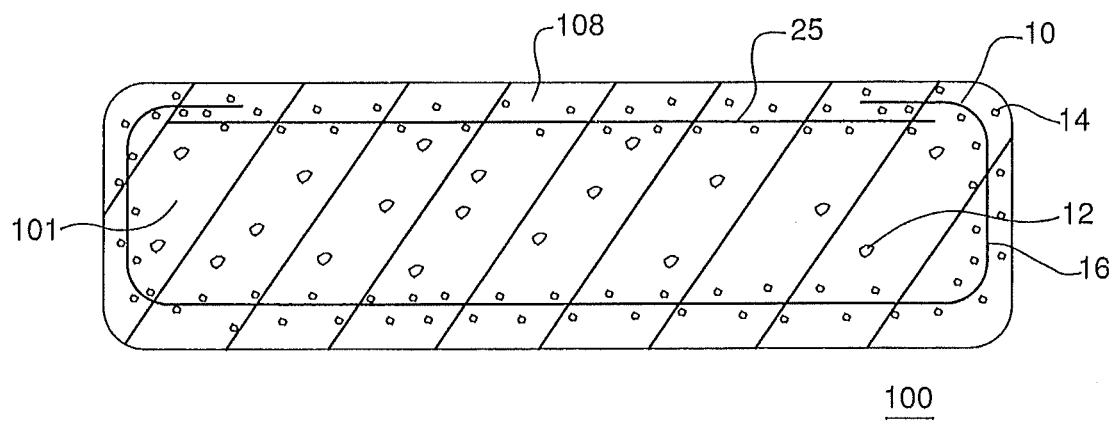
FIG. 1 is a side cross-sectional view of a cement board of the present invention showing an embedded fabric.

In accordance with the present invention, the following definitions are used:

Areal weight. The weight of coated or uncoated fabric per unit area (width×length).

Cementitious material. An inorganic hydraulically setting material, such as those containing one or more of: Portland cement, mortar, plaster, gypsum, and/or other ingredients, such as, foaming agents, aggregate, glass fibers, moisture repellants and moisture resistant additives and fire retardants.

Composite facing material. Two or more layers of the same or different materials including two or more layers of fabrics, cloth, knits, mats, wovens, non-wovens and/or scrims, for example.

Fabric. Woven or non-woven flexible materials, such as tissues, cloth, knits, weaves, carded tissue, spun-bonded, point-bonded, and mesh-type scrim wovens and non-wovens, needled or braided materials.

Fiber. A general term used to refer to filamentary materials. Often, fiber is used synonymously with filament. It is generally accepted that a filament routinely has a finite length that is at least 100 times its diameter. In most cases, it is prepared by drawing from a molten bath, spinning, or by deposition on a substrate.

Filament. The smallest unit of a fibrous material. The basic units formed during drawing and spinning, which are gathered into strands of fiber for use in composites. Filaments usually are of extreme length and very small diameter. Some textile filaments can function as a yarn when they are of sufficient strength and flexibility.

Glass. An inorganic product of fusion that has cooled to a rigid condition without crystallizing. Glass is typically hard and relatively brittle, and has a conchoidal fracture.

Glass fiber. A fiber spun from an inorganic product of fusion that has cooled to a rigid condition without crystallizing.

Knitted fabrics. Fabrics produced by interlooping chains of filaments, roving or yarn.

Mat. A fibrous material consisting of randomly oriented chopped filaments, short fibers, or swirled continuous filaments held together with a binder.

Roving. A number of yarns, strands, tows, or ends collected into a parallel bundle with little or no twist.

Scrim. A low cost reinforcing fabric made from continuous filament yarn or strand in an open-mesh construction; can be woven or laid, for example.

Sizing. A substance or process of applying the substance directly on fibers of a fabric or yarn for strengthening, imparting chemical compatibility to, or protecting, the fibers of a fabric or a yarn.

Strand, One or more fibers or filaments in a group that is handled as an entity as an input in a textile process, e.g., a twisted roving or yarn.

Tensile strength. The maximum load or force per unit cross-sectional area, within the gage length, of the specimen. The pulling stress required to break a given specimen. (See ASTM D579 and D3039)

Tex. Linear density (or gauge) of a fiber expressed in grams per 1000 meters.

Textile fibers. Fibers or filaments that can be processed into yarn or made into a fabric by interlacing in a variety of methods, including weaving, knitting and braiding.

Warp. The yarn, fiber or roving running lengthwise in a woven, knit or laid or woven scrim fabric. A group of yarns, fibers or roving in long lengths and approximately parallel.

Weave. The particular manner in which a fabric is formed by interlacing yarns, fibers or roving. Usually assigned a style number.

Weft. The transverse threads or fibers in a woven, knit or laid or woven scrim fabric. Those fibers running perpendicular to the warp. Also called fill, filling, yarn or woof.

Woven fabric. A material (usually a planar structure) constructed by interlacing yarns, fibers, roving or filaments, to form such fabric patterns as plain, harness satin, or leno weaves, for example.

Woven roving. A heavy glass fiber fabric made by weaving roving or yarn bundles.

Yarn. An assemblage of twisted filaments, fibers, or strands, either natural or manufactured, to form a continuous length that is suitable for use in weaving or interweaving into textile materials.

Zero-twist-yarn. A lightweight roving, i.e., a strand of near zero twist with linear densities and filament diameters typical of fiberglass yarn (but substantially without twist).

DETAILED DESCRIPTION OF THE INVENTION

Facing materials, cementitious boards and methods of manufacturing cementitious boards having the facing materials of this invention are provided. Facing materials which are embedded totally, or only partially, so as to present a fibrous facing, are within the scope of this invention. The fabric reinforcements of this invention can be employed in many end-use reinforcement applications, such as, for example, gypsum and cement boards, asphalt and road reinforcement, roofing applications, soil reinforcement, polymer-matrix reinforcement, and as stand-alone coated fabrics in filters, screens and garment applications.

With reference to the Figures, and particularly to FIGS. 1-6 thereof, there is depicted a cement board 100 and coated glass fabric reinforcement 10 having coated warp yarns 16 and coated weft yarns 14 disposed in a preferred laid scrim, useful as an embedded facing layer of the preferred cement board 100 of this invention. Needled, woven, knitted, braided and mesh-type non-woven and composite materials can be employed because of their impressive strength-to-weight ratio and, in the case of wovens, braided, knits, and non-woven mesh-types (also referred to as "scrim"), their ability to form weft and warp yarn patterns which can be manipulated to create directional absorption of coatings, or even intentionally "unbalanced" coating weight distributions. While the facing layers of this invention can contain fibers and filaments of organic and inorganic materials, the most preferred fibers contain glass (AR, E, C, ECR, R or S-glass), olefin (such as polyethylene, polystyrene and polypropylene), Kevlar®, graphite, rayon, polyester, carbon, ceramic fibers, mineral fibers, or combinations thereof, such as glass-polyester blends or Twintex® glass-olefin composite, available from St. Gobain Corporation, France. Of these types of fibers and filaments, glass compositions are the most desirable for their fire resistance, low cost and high mechanical strength properties. The most preferred yarns are olefin coated C or E glass.

In a first embodiment of the present invention shown in FIG. 1, a cement board 100 is provided, including a cement matrix 101 and coated glass fabric reinforcement 10, which, preferably, presents a thin cementitious layer 108 on its surface. The coated glass fabric reinforcement 10 includes, preferably, individually coated warp yarns 16 and weft yarns 14 in a laid scrim. The cementitious core 101 can further include performance additives 12 which can be added to the slurry precursor of the core 101. Cement boards having cementitious surfaces and a mesh of reinforcing fibers underlying the top, bottom and longitudinal edge surfaces are presently known, see, for example, U.S. Pat. No. 4,916,004, which discloses the use of a woven glass fiber mesh embedded into a cement matrix.

The preferred glass mat reinforcement 10 of the present invention includes polyolefin based coatings. The invention particularly employs "soft" polyolefin compositions which have a Gurley Stiffness measurement of about 100-3000 mg and an ASTM D 638 (2% Secant) modulus of compression of about 1-100 MPa, when coated onto glass yarns. The glass fiber fabric reinforcement 10 of this invention is, desirably, sufficiently drapable so as to be folded around the corners of the cement board before final setting. Folding can be accomplished by a combination of guide flanges and rollers which thus embed the fabric reinforcement 10 near the upper surface of the board 100 along with a preferred separate top fabric reinforcement 25 to form overlapping portions along the lateral sides, as shown in FIG. 1. The embedding of the fabric reinforcement 10 must, of course, take place before the initial set of the concrete has occurred, but the mix should not be so soupy at the point of embedding that the mesh will rise up again after passing under a forming spatula or guide. The Gurley Stiffness of the fabric desirably is similar to conventional PVC plastisol coated glass fabric so as to, preferably, permit the use of the fabrics of this invention in conjunction with existing continuous cement and gypsum board manufacturing equipment with little or minor adjustment.

Figure 2:
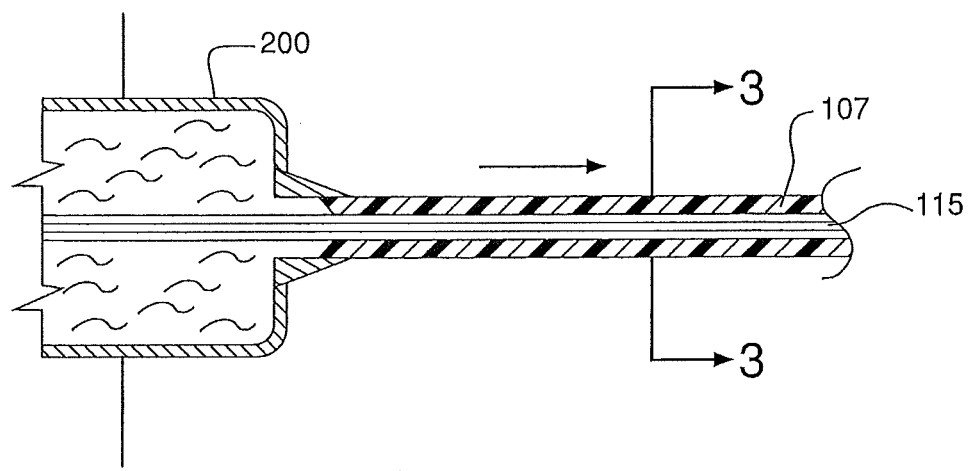
FIG. 2 is a diagrammatic side cross-sectional view of a yarn being extruded with the preferred polyolefin compositions of this invention.
Figure 3:
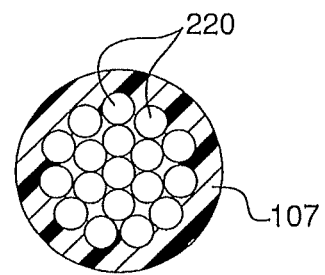
FIG. 3 is an enlarged cross-sectional view of the coated yarn taken through line 3-3 of FIG. 2, showing glass filaments in a yarn with an applied coating.

As shown in FIGS. 2 and 3, the preferred coated warp yarn 16 and coated weft yarn 14 are individually manufactured by drawing a glass fiber yarn or roving 115 through an extrusion die 200, whereby a polymeric coating 107 is applied uniformly to the yarn or roving 115. As shown in FIG. 3, the coating 107 is relatively uniform about the yarn and coats at least the exterior side of the outlying filaments 220, but, depending on the viscosity and temperature of the polymeric coating, some or total impregnation within the openings of the yarn or roving 115 can be accommodated.

Figure 4:
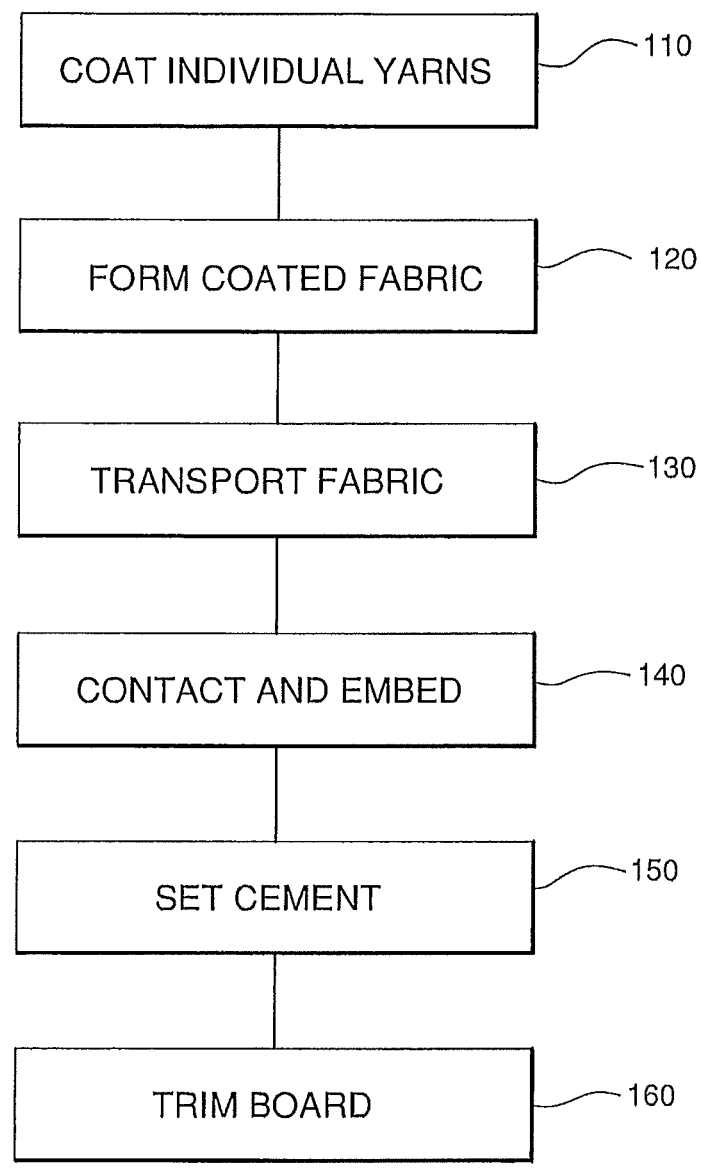
FIG. 4 is a step by step flow diagram of a preferred method of making a cement board according to this invention.

As disclosed in FIG. 4, the present invention includes the steps of coating the individual yarns 110, primarily by extrusion, although dip coating can be less desirably employed in some circumstances. The coated individual yarns are then formed into a coated fabric at step 120. The fabric can be woven or non-woven, although laid scrim whereby the weft yarns are alternated above and below the warp yarns is preferred. The coated fabric is then transported at step 130 to a preferred continuous cementitious board line. The coated fabric is then contacted and embedded into a cementitious core material at step 140, followed by permitting the cementitious material to set at step 150. During the setting of the cementitious material, the slurry solidifies and reaches an elevated temperature. The polyolefin compositions used to form the coated fabric of the present invention would most desirably, but not necessarily, have a higher melting temperature than the temperature at which the cementitious material sets, so as to provide a homogenous and continuous coating for protecting against corrosion resistance in an alkaline environment after the cementitious material is hardened. Following setting of the cementitious material step 150, the board is trimmed at step 160, such as by mechanical saw or water knife. Further details of the manufacturing process are explained below.

Fabric Fabrication Process

Once the continuous glass fibers have been produced they must be converted into a suitable form for their intended application. The major finished forms are continuous roving, woven roving, fiberglass mat, chopped strand, and yarns for textile applications.

The fabric reinforcement 10 of the invention can be made in many constructions, such as laid scrim, stitchbonding or warp knitting, and can be made by conventional means such as plain weaving, twill or satin weaving, unidirectional weaving, knitting or stitchbonding. Fine-fiber strands of yarn from the forming operation can be air dried on forming tubes to provide sufficient integrity to undergo a twisting operation. Twist provides additional integrity to yarn before it is subjected to the weaving process, a typical twist consisting of up to 0.7-1.0 turns/inch. In many instances heavier yarns are needed for the weaving operation. This is normally accomplished by twisting together two or more single strands, followed by a plying operation. Plying essentially involves retwisting the twisted strands in the opposite direction from the original twist. The two types of twist normally used are known as S and Z, which indicate the direction in which the twisting is done. Usually, two or more strands twisted together with an S twist are plied with a Z twist in order to give a balanced yarn. Thus, the yarn properties, such as strength, bundle diameter, and yield, can be manipulated by the twisting and plying operations. Fiberglass yarns are converted to fabric form by conventional weaving operations. Looms of various kinds are used in the industry, but the air jet loom is the most popular.

Zero twist-yarns may also be used. This input can offer the ease of spreading of (twistless) roving with the coverage of fine-filament yarns. The number of filaments per strand used directly affects the porosity and is related to yarn weight as follows: $n=(490 \times Tex)/d^2$, where "d" is the individual filament diameter expressed in microns. Thus, if the roving with coarse filaments can be replaced with near zero twist yarn with filaments half the diameter, then the number of filaments increases by a factor of 4 at the same strand Tex.

The major characteristics of the knit or woven facing embodiments of this invention include its style or weave pattern, fabric count, and the construction of warp yarn and fill yarn. Together, these characteristics determine fabric properties such as drapability and performance in the final board. The fabric count identifies the number of warp and fill yarns per inch. Warp yarns run parallel to the machine direction, and fill yarns are perpendicular.

When the preferred glass fibers are employed, a sizing is generally used. Preferred sizings for use with a fibrous layer comprised of glass filaments include aqueous sizings comprising one of the following blends: 1) an epoxy polymer, vinyl and amine coupling agents and a non-ionic surfactant; 2) an epoxy polymer, amine coupling agent and a non-ionic surfactant; 3) an epoxy polymer, methacrylic and epoxy coupling agents, and cationic and non-ionic surfactants (paraffin lubricants); 4) anhydrous polymerized acrylate amine (for example, the substance disclosed in PCT Patent Application No. WO 99/31025, which is incorporated herein by reference), methacrylic and epoxy coupling agents and a non-ionic surfactant; and 5) anhydrous polymerized epoxy amine (for example, as disclosed in U.S. Pat. No. 5,961,684 to Moireau et al., which is incorporated herein by reference), vinyl and amine coupling agents, and a non-ionic surfactant, each of the above blends being produced by Cem FIL Reinforcements of Saint Gobain Vetrotex Cem-FIL® S.L., a Saint Gobain Vetrotex company. Preferably, the non-ionic surfactant comprises an organo-silane. These sizings are compatible with the preferred coatings for the preferred fabric reinforcement 10 and the cementitious core 101, and improve initial fiber strength and ease of fabric forming. The sizings preferably comprise not more than 2.5% by weight, and most preferably less than 1.5% by weight of the fibrous layer. The preferred sizing is one that is compatible with polypropylene (PP), such as those conventionally used for PP composites. See U.S. Pat. No. 5,648,169, for example, which is hereby incorporated by reference in its entirety.

The following fabric styles and categories are useful in the practice of this invention:

| Fabric | Areal wt. grams/m2 | Areal wt. oz/yd2 |
|---|---|---|
| Light weight | 10-35 | 3-10 |
| Intermediate weight | 35-70 | 10-20 |
| Heavy weight | 59-300 | 15-90 |

| Fabric | Thickness μm | Thickness mil |
|---|---|---|
| Light weight | 25-125 | 1-5 |
| Intermediate weight | 125-250 | 5-10 |
| Heavy weight | 250-500 | 250-500 |

It has been determined that the fabric reinforcement 10 desirably has an areal weight of about 15-300 grams/m$^2$, preferably about 30-150 grams/m$^2$, and thicknesses of about 5-22 mils, with 10-15 mils being most preferred. The linear density of the preferred glass fibers preferably ranges from about 50 tex where yarns are employed, to 2,500 tex where rovings are employed, with 68 tex being currently preferred. Where carbon fibers are used, they're preferably provided as tows, with the filament count preferably ranging from about 3,000 to 24,000. Preferred properties of glass fibers include a virgin filament tensile strength of at least about 185,000 psi or higher; Young's modulus of elasticity of about 10-12 million psi; strain at breaking point of at least about 1.5% or higher; water uptake at less than about 0.1%, and softening temperature of about 860° C. The preferred fabric reinforcement 10 should also possess an ASTM D309 tensile strength of at least about 20 psi in the machine direction and about 5 psi in the cross-machine direction.

In certain applications, exposed (projecting out of the nonwoven, scrim or woven fabric) but coated fibers are acceptable to enable attachment. In cement boards generally, each yarn or coating should be as completely coated as possible to avoid corrosion. Some exposed coated fibers enable attachment to factory or field applied coatings or adhesives such as Portland cement based mortar, acrylic adhesive, silicone adhesive and glue on the outer surface of the cementitious board. The selected binders and finishes should also minimize "blocking" (adhesive bonding between adjacent boards during storage). Additionally, the preferred binders can be provided with additives, such as UV and mold inhibitors, fire retardants, etc. Carboxylated polymer additions to the binder resin can promote greater affinity to set gypsum, or to Portland cement-based mortars, for example, but are less subjected to blocking than resins without such additions.

The binders or finishes can be applied in 1, 2 or 3 layers or passes. The first application quality depends highly on tensions and twist level. If, after this coating is fused, a second coating (binder or finish) is applied, the tension and twist is a little less important as the strands are now acting as if they were monofilament yarns because they have a monolithic coating on them. Additional coatings are optional, and without them, the resulting porosity is generally very high. This is good as the reinforcement is generally buried just beneath the surface of the cement board. High porosity aids in this embedding. Subsequent coatings to reduce porosity may not be necessary except in the case where a very smooth surface is required.

The fabrics reinforcements 10 of this invention can be further coated prior to adhering these layers to a core 101 in order to further reduce porosity, to resist slurry penetration, reduce corrosion, improve strength or fire resistance, and/or to reduce the "fuzziness" of the surface, which can lead to some itching during repeated handling. The additional coating is distinguished from the sizing or binder used to bond the fibers together to form the individual layers, as described above, but can be the same or different composition. The additional coating can include those described in U.S. Pat. No. 4,640,864, which is hereby incorporated by reference, and are preferably water-resistant and/or fire-retardant in nature. They are preferably applied during the manufacture of the fabric reinforcement 10 of this invention, but may be applied by the board manufacturer prior to use in making cementitious boards 100.

The additional coating 107 applied to the fabric reinforcement 10, as shown in FIG. 3 of this invention, preferably coats the glass strands 220 in the warp yarns 16 and weft yarns 14 of the fabric reinforcement 10. Alternatively, the additional coating 107 can increase or decrease the wetting angle of the cementitious slurry to reduce penetration or increase adhesion. The coating 107 can further contain a UV stabilizer, mold retardant, alkali-resistant formulation, water repellant, a flame retardant and/or other optional ingredients, such as dispersants, catalysts, fillers and the like. The coating 107 can be in melt or liquid form and the fabric reinforcement 10 is led through the melt or liquid, or the melt or liquid is sprayed (with or without a water spray precursor) on one or both sides of the fabric reinforcement 10.

The preferred additional coating of this invention can contain a resinous mixture containing one or more resins. The resin can contain solid particles or fibers which coalesce or melt to form a continuous or semi-continuous coating over and through the yarns. The coating 107 can be applied in various thicknesses to sufficiently cover the fibrous constituents of the fabric reinforcement 10 so that no fibers protrude from the added coating, or to such a degree that the fibers protrude from the added coating so that they can be used to join to additional layers in a EIF system or to mortar for tile, for example. The additional coating can form an alkali barrier which protects the fabric from alkaline cement cores, for example. The additional coating can comprise a thermoplastic or a thermoset resin, although extruded polyolefin copolymers are preferred.

The coating 107 can be formed from a mixture of resin and fillers, such as silicates, silica, gypsum, titanium dioxide and calcium carbonate. In addition, fire retardants, such as bromated phosphorous complex, halogenated paraffin, colloidal antimony pentoxide, borax, unexpanded vermiculite, clay, colloidal silica and colloidal aluminum can be added to the resinous coating 107 or saturant. Furthermore, water resistant additives can be added, such as paraffin, and combinations of paraffin and ammonium salt, fluorochemicals designed to impart alcohol and water repellency, such as FC-824 from 3M Co., organohydrogenpolysiloxanes, silicone oil, wax-asphalt emulsions and poly(vinyl alcohol) with or without a minor amount a minor amount of poly(vinyl acetate). The added coating can include pigment, such as kaolin clay, or lamp black thickeners such as modified bentonite clay, defoamers, such as fatty acid/polyglycol mixtures, UV resistance additives, setting accelerators, such as clay compounds, polyacrylamide, potassium salts, or combinations thereof, and dispersants such as sodium polyacrylate. Known preservatives and, of course, water can be added in latex compositions, and solvents in thermosetting compositions. (See, for example, U.S. Pat. No. 4,640,864, which includes insulation boards including polyvinylchloride based coatings including fire- and water-repellants, and which is hereby incorporated by reference). Other additives, suggested herein as being useful in the binder or cementitious core 101, could also be employed in the added coating.

The resinous coating 107 as shown in FIG. 3, is preferred where the fibrous layer is comprised of non-AR glass; however, coatings are not necessary where the fibrous layer is comprised of AR-glass, PVA, carbon or aramid fibers. The resinous coating 107 desirably provides mechanical and chemical protection to the glass filaments or strands 220. The resinous coating 107 is preferably a polyolefin such as polyethylene ("PE") or polypropylene ("PP"), which has been made "soft" so as to make the resulting fabric reinforcement 10 drapable and less resilient.

Customers who manufacture cement boards 100 expect the "hand feel" and "drapability" of the glass reinforcement to be similar to current PVC plastisol coated product. From a practical standpoint, this means the fabric reinforcement will preferably play off the roll in a similar fashion to the current PVC plastisol product, and will preferably have a similar drapability and lack of shape memory when the reinforcement is curved around the edge of the cement board, as shown in FIG. 1.

The polyolefin coating compositions of this invention preferably have a Gurley Stiffness measurement of less than 5000 mg, more preferably about 100-3000 mg, and most preferably about 500-2500 mg. Gurley Stiffness is a technique used to determine the bending moment of fabrics, scrims and other similar materials. The technique provides information on the drapability of fabric. Scrim with very high Gurley Stiffness values, such as those over 5000 mg, would be too stiff to be wound around the spools, and any coating on the scrim would likely crack. Additionally, fabric and scrims as a reinforcement in cement board composite applications should be flexible so as to provide better impact toughness during bending. At the lower end of the range, the Gurley Stiffness should be at least 100 mg, and most preferably, about the same stiffness as a PVC plastisol coated scrim, which is currently the benchmark for flexibility. The fabric reinforcement 10 should also have an ASTM D 638 (2% Secant) modulus of compression of about 1-100 MPa, and more preferably about 5-35 MPa.

Polypropylene resin can be extruded over individual yarns and filaments without the use of a plasticizer. The polypropylene coating will generally have the same viscosity and rheology at the same temperature, and there are hardly ever voids in the coating, or solids to be removed. Extrusions of polypropylene and polyethylene provide a uniform coating, and rarely does a batch of coating material need to be scrapped for not meeting viscosity requirements. This invention creates "soft" versions of polyolefin compositions because relatively pure polypropylene and polyethylene coated yarns would not be very drapable and would result in a stiff fabric that would be difficult to bend around corners. The desired fabric should be soft enough to form about a 0.5 in radius in or on a cement board 100 without springing back to its original shape prior to initial setting. Polypropylene emulsions, while technically feasible, are not a very good option for coating reinforcements for cement boards, since such emulsions are typically waxes, and become too brittle for cement board reinforcement applications.

Applicants' extrusion coating with polyolefin compounds over glass yarns is an improved technology platform. Quantity polyolefins such as polyethylene and polypropylene would be inexpensive alternatives to PVC plastisols. Polymers like acrylics could be used but are relatively more expensive. Polypropylene compounds are most desirable, since sizing has been developed for polypropylene reinforced composites for some time, and could be adapted for glass yarns.

The present invention, therefore, relies principally upon polypropylene extrusion coating of glass yarns as a proposed alternative to PVC plastisol or plasticized PVC coated glass yarns. The compositions generally comprise a blend of a major portion of a first polymeric component, which is either reactor made, heterophasic copolymer of PP or post-reactor blended mixtures of PP homopolymer and ethylene-propylene rubber. Other PP or PE compositions are also satisfactory. The reactor made heterophasic copolymers are slightly more desirable due to incorporation of high ethylene content. A second minor component of low density ethylene-α-olefin polymer can be added to improve melt flow. The composition, additionally, can include maleic anhydride modified PP as an adhesion promoter, and may also additionally include inorganic fillers such as talc or vinylidene fluoride-hexafluoropropylene copolymer. The glass fiber laid scrims prepared from the preferred extrusion processes coat glass yarns individually in the polyolefin composition, preferably including a polypropylene copolymer as a major component, and up to 5 wt % ethylene-olefin copolymer. Some "soft" PP compositions, compared to stiffer resinous compositions, are described below.

TABLE 1

Stiffness values of compression molded films and glass scrims coated with different formulations based on PP.

| Formulation Type | ASTM D 638 (2% Secant Modulus) | Gurley Stiffness of scrims (mg) |
|---|---|---|
| PVC plastisol | ~17 MPa | ~1350 (1X) |
| PP homopolymer | ~900-1000 Mpa | ~8000 (6X) |
| PP homopolymer + ethylene-α-olefin | ~400-700 Mpa | ~5000 (4X) |
| PP copolymer + PP homopolymer + ethylene-α-olefin | ~19-25 Mpa | ~1600 |
| PP copolymer + ethylene-α-olefin + PP homopolymer + talc | ~30 Mpa | ~1750 |

TABLE 2

Preferred "Soft" PP formulations.

| Type | Composition wt % or ppm | Function |
|---|---|---|
| Heterophasic PP copolymer | 70-80 | Flexibility |
| PP homopolymer | 10-30 | Improve processability |
| Ethylene-olefin copolymer | 0-5 | Processability, softness |
| Maleic anhydride-g-PP | 2-4 | Adhesion promoter |
| Talc (treated or untreated) inorganic filler | 0-20 | Filler, adhesion to cement |
| Vinylidene fluoride-hexafluoroalkene copolymer | 500-1500 ppm | Process aid, reduce surface roughness, higher line speeds |

Figures 5, 6:
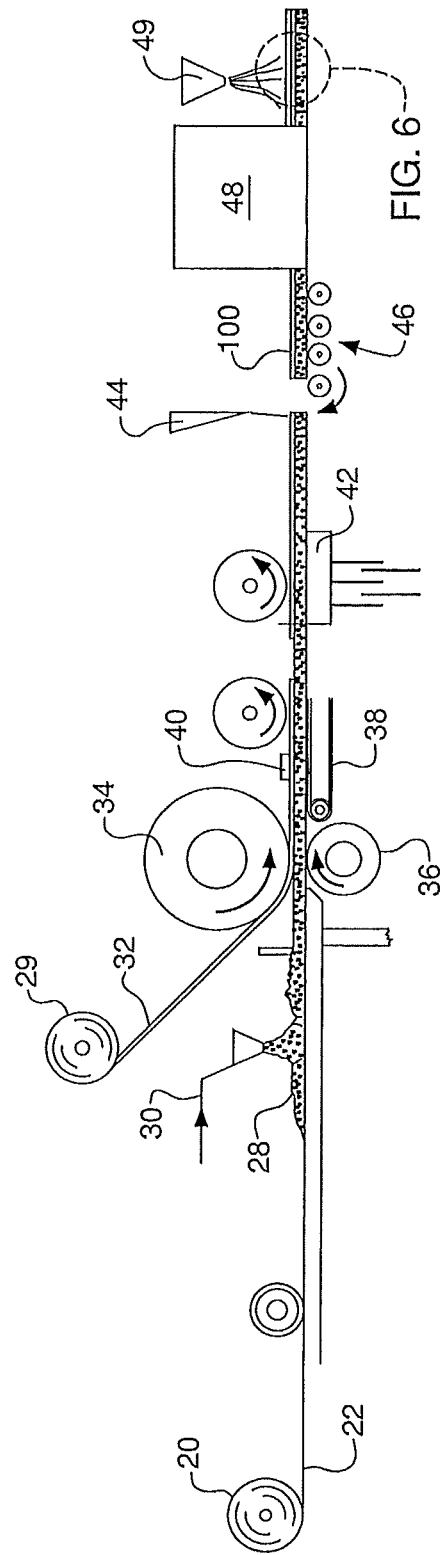
FIG. 5 is a diagrammatic, side elevation view of a proposed continuous manufacturing line for producing cementitious boards using the fabric of this invention.
FIG. 6 is a graphical depiction of Gurley Stiffness (mg) of coated scrims showing polymer composition vs. Gurley Stiffness (mg).
Figure 6:
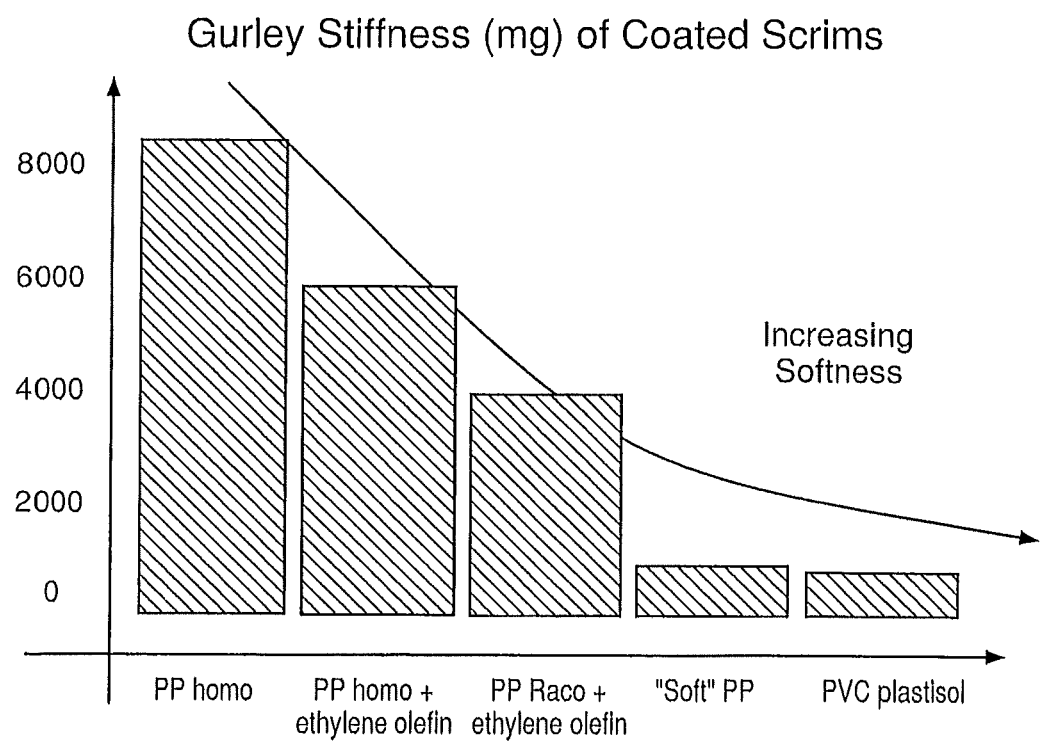

As can be shown in FIG. 6, the Gurley Stiffness is greatly enhanced by PP copolymer compounds of this invention, with the polypropylene copolymer and polypropylene homopolymer blends, including ethylene-α-olefin performing most similarly to the PVC plastisol conventional reinforcement.

HECO Resins

Polymer blends are now regarded as an economical alternative to the development of new polymers. Marques et al., at p. 1. Materials with improved end use properties can be obtained by blending polymers with different molecular characteristics. Id. In the case of polyolefins, they are immiscible since small differences in the shape of the molecules give rise to unfavorable intermolecular forces. Id. Further immiscibility arises as the polyolefins crystallize into different crystal domains. Id.

While having a number of valuable properties and economic benefits, polypropylene homopolymer exhibits a poor impact resistance, mainly at low temperatures. Id. This fact is due to its relatively high glass transition temperature (Tg). Id.

The improvement of some of these properties is typically achieved by blending polypropylene to other polymers or with reinforcing fillers. Id. More specifically, polypropylene with improved impact strength has been produced by the addition of an amorphous material, a poorly crystallized material or an elastomer, as EPDM, for example. Id.

High melt strength technology has been applied to production of heterophasic propylene-ethylene copolymers to produce extrusion coating resins with a unique combination of rigidity, heat resistance, toughness, pin-holing resistance and other properties. Beren at p. 97. The resin's strong strain hardening characteristic allows high-speed processing at low coating weights without draw resonance, Id.

The resins are high melt strength versions of heterophasic propylene-ethylene copolymers, commonly known as medium-impact copolymers and commonly abbreviated as HECOs. Id.

The distinguishing feature of HECO resins, from which they take their name, is the presence of two distinct phases:

a continuous homopolymer base which provides rigidity and heat resistance.

a finely dispersed phase of ethylene-propylene rubber, a random copolymer of ethylene and propylene with ethylene predominating. This phase provides internal cushioning and elasticity, which improves impact strength and tear resistance. Id.

Both phases are produced in situ in the reactor via a sequential polymerization process. Id. HECO resins are not produced by blending the materials which form the two phases. Id.

HECO resins are well known in applications such as thermoforming, blow molding, and injection molding, but have not normally been found in extrusion coating. Id.

The one method of producing a PP extrusion coating resin is to add a quantity, usually 12-20%, of branched LDPE to improve the melt strength. This allows coating speeds up to ~200 m/min, but results in some compromise of PP's properties, especially with respect to heat resistance. Id. More preferably, high performance polypropylene extrusion coating can be used to produce high melt strength versions of PP homopolymer and propylene-ethylene copolymers (both random and heterophasic). Id. For a more detailed discussion of the extensional rheology of high melt strength polypropylene and its relationship to extrusion coating, please see "High Performance Polypropylene Extrusion Coating Resins" by Phillips, McHugh and Bradley, Proceedings—1989 TAPPE Polymers Laminations and Coatings Conference, Orlando Fla., Sep. 5-8, 1989, hereby incorporated herein by reference.

Two high melt strength HECO coating resins are exemplary:

A 20 MFR version offering the higher performance in terms of impact strength and pin-holing resistance.

A 30 MFR version for less demanding applications.

Other less desirable materials include:

Homopolymer PP: A commercial 30 MFR resin offering high rigidity and heat resistance. Produced using high melt strength technology to coat at high speed without modification.

PP-LDPE Alloy: A commercial 15 MFR alloy with a linear PP component and LDPE added for melt strength.

Randon Copolymer: A commercial 12 MFR resin used as a heat seal layer in high temperature applications. Produced using high melt strength technology to coat at high speed without modification.

HDPE: A commercial 7 MI resin.

LDPE: A commercial 8 MI resin. Id.

The standard physical properties of the HECO coating resins and other PP and PE coating are shown in Table 3, below:

TABLE 3

Standard resin physical properties

| PROPERTY | HECO | HOMO PP | PP-LDPE ALLOY | RANDOM COPO | HDPE | CDPE |
| --- | --- | --- | --- | --- | --- | --- |
| Tensile strength | 26 | 37 | 25.4 | 29.5 | 20 | 12 |
| Flexural Modulus, MPa | 1285 | 1900 | — | 1100 | 110 | 21 |
| Rockwell Hardness, R | 81 | 100 | 83 | 89 | — | — |
| Shore D | — | — | — | — | 65 | 48 |
| Notched Izod, J/mm | 76 | 32 | — | 57 | — | — |
| Heat Deflection Temp @ 455 kPa ° C. | 93 | 121 | 75 | 86 | 68 | 46 |

There is an important benefit of extrusion coating open-weave PP fabrics with HECO resins. Id at 98. A common example of such a fabric is open-weave, or low-count, raffia. When coating with homopolymer or alloy resins, a void in the coating will tend to coincide with any sizable (>mm diameter) void in the fabric. It has been observed that this occurs to a lesser extent when coating with HECO resins. Id, at 98.

The HECO material, like all the PP types, has much greater strength, rigidity, and heat resistance than any type of PE. It is also unique among the PP types in the degree to which is maintains most of homopolymer polypropylene's heat resistance while gaining significant impact strength. This is a manifestation of the material's dual character of homopolymer continuous phase controlling some physical properties, while the propylene-ethylene rubber toughens it. Id. at 98.

The properties of heterophasic polypropylene copolymers are attractive for extrusion coating in several respects, including:

excellent processability with high line speed and high draw capabilities;

good pin-holing resistance, including excellent ability to bridge voids in open-weave fabrics; and a combination of heat resistance, rigidity and toughness unique among polyolefin coating resins. Id, at 99.

Board Manufacturing

With reference to FIG. 5, a preferred method of continuously manufacturing cementitious boards is described.

While it is preferred that slightly-modified, conventional wallboard or cement board manufacturing equipment be employed for producing the cementitious boards 100 of this invention, cementitious boards 100 can be manufactured in any number of ways, including molding, extrusion, and semi-continuous processes employing rollers and segments of the fabric reinforcement 10 of this invention. As shown in FIG. 1, the fabric reinforcement 10 can be embedded in the cementitious core 101, such as to present a thin cementitious film 108 on the face of the board 100. The fabric reinforcement 10 can be embedded, or alternatively, be adhesively or mechanically bonded to the core 101 such as by the set core 101, itself.

The cementitious board 100 includes a set cementitious core 101, made of set gypsum or Portland cement, for example. The cementitious core 101 preferably comprises a cementitious material, such as cement paste, mortar or concrete, and/or other types of materials such as gypsum and geopolymers (inorganic resins). More preferably the inorganic matrix comprises Portland cement having chopped fibers dispersed throughout the cement. Preferably the fibers are AR-glass fibers but may also include, for example, other types of glass fibers, aramids, polyolefins, carbon, graphite, polyester, PVA, polypropylene, natural fibers, cellulosic fibers, rayon, straw, paper and hybrids thereof. The inorganic matrix may include other ingredients or additives such as fly ash, latex, slag and metakaolin, resins, such as acrylics, polyvinyl acetate, or the like, ceramics, including silicon oxide, titanium oxide, and silicon nitrite, setting accelerators, water and/or fire resistant additives, such as silioxane, borax, fillers, setting retardants, dispersing agents, dyes and colorants, light stabilizers and heat stabilizers, shrinkage reducing admixtures, air entraining agents, setting accelerators, foaming agents, or combinations thereof, for example. In a preferred embodiment, the inorganic matrix includes a resin that may form an adhesive bond with a resinous coating applied to the alkali-resistant open fibrous layer. Preferably the cementitious core 101 has good bonding with fabric reinforcement 10, but also may be composite materials, including additional mats, or scrim of fabrics, for example. The cementitious core 101 may contain curing agents or other additives such as coloring agents, light stabilizers and heat stabilizers, for example.

Examples of materials which have been reported as being effective for improving the water-resistant properties of cementitious products either as a binder, finish or added coating, or performance additive 12 are the following: poly(vinyl alcohol), with or without a minor amount of poly(vinyl acetate); metallic resinates; wax or asphalt or mixtures thereof; a mixture of wax and/or asphalt and also corn-flower and potassium permanganate; water insoluble thermoplastic organic materials such as petroleum and natural asphalt, coal tar, and thermoplastic synthetic resins such as poly(vinyl acetate), polyvinylchloride and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin, aromatic isocyanates and disocyanates; organohydrogenpolysiloxanes and other silicones, acrylics, and a wax-asphalt emulsion with or without such materials as potassium sulfate, alkali and alkaline earth eliminates. Performance additives 12 can be introduced directly into the cementitious slurry 28, in FIG. 5. The added coating can be applied to the fabric reinforcement 10 before and/or after joining to the cementitious core 101.

If gypsum is employed, the core may be formed by mixing water with powdered anhydrous calcium sulfate or calcium sulfate hemidrate ($Ca-SO_4$ $½H_2O$), also known as calcined gypsum, and thereafter allowing the mixture to hydrate or set into calcium sulfate dihydrate ($CaSO_4$ $2H_2O$), a relatively hard material. The cementitious core 101 of the support member will in general comprise at least about 85 wt. % set gypsum or cement.

The surface of the cementitious core 101 is faced with one or more layers of the fabric reinforcement 10. The fabric reinforcement 10 should be at least sufficiently porous to permit water in the aqueous slurry from which the core is made to evaporate therethrough, and may be porous enough to permit the slurry to pass through and form a continuous or discontinuous film. As described in the detail below, the cementitious board 100 in the present invention can be made efficiently by forming an aqueous slurry which contains excess water and placing thereon the facing material. Aided by heating, excess water evaporates through the preferred upper and lower glass fabric reinforcement 10 as the slurry sets.

Continuous Manufacturing Method

An attractive feature of the present invention is that the cementitious board 100 can be made utilizing existing wallboard or cement board manufacturing lines, for example, as shown somewhat diagrammatically in FIG. 5. In conventional fashion, dry ingredients (not shown) from which the cementitious core 101 is formed are pre-mixed and then fed to a mixer of the type commonly referred to as a pin mixer 30. Water and other liquid constituents (not shown) used in making the core are metered into the pin mixer 30 where they are combined with the dry ingredients to form an aqueous cementitious slurry 28. Foam is generally added to the slurry in the pin mixer 30 to control the density of the resulting cementitious core 101.

As is common practice in the manufacture of conventional paper-faced gypsum board, the two opposite edge portions of the bottom glass fabric 22 are progressively flexed upwardly from the mean plane of the bottom glass fabric 22 and then turned inwardly at the margins so as to provide coverings for the edges of the resulting board 100, as shown in FIG. 1.

A sheet of top glass fabric 32 is fed from the top glass fabric roll 29 onto the top of the cementitious slurry 28, thereby sandwiching the slurry between the two moving fabrics which form the facings of the cementitious core 101 which is formed from the cementitious slurry 28. The bottom and top glass fabrics 22 and 32, with the cementitious slurry 28 sandwiched therebetween enter the nip between the upper and lower forming or shaping rolls 34 and 36 and are thereafter received on a conveyor belt 38. Conventional wallboard edge guiding devices 40 shape and maintain the edges of the composite until the slurry has set sufficiently to retain its shape. Water of convenience, or excess water, can be drained with the assistance of vacuum boxes 42 disposed below the conveyor belt 38. In due course, sequential lengths of the board are cut by a water knife 44. The cementitious board 100 is next moved along feeder rolls 46 to permit it to set. It is further processed by exposure to heat in a drying oven 48 which accelerates the drying of the board by increasing the rate of evaporation of excess water. An additional sprayer 49 can be provided to add further treatments, such as silicone oil, additional coating, or fire retardants, to the board's exterior. The manufacturing techniques described in the "Background" section are also acceptable.

The fabric reinforcement 10 and cementitious boards 100 of this invention are useful in all sorts of building construction applications. They are strong, having a screw strength of at least about 20 lbs., for gypsum cores of conventional densities and compositions. Some examples include shaft wall assemblies for elevators and stairways, fire doors and fire walls, roofing and siding substrates, with or without insulation, and tile backer boards. Some of the most desirable and useful applications for this invention are in EIF systems (also called EIFS, for Exterior Insulation Finishing Systems), or as tile backer boards.

From the foregoing, it can be realized that this invention provides improved coating techniques for fabrics and reinforcements, and specifically enables a uniform coating to be applied to the warp and weft yarns of a knitted, braided, non-woven mesh-type, or woven fabric without VOC's and viscosity control constraints.

The present polyolefin soft compositions provide equal or better performance than plastisol coated laid scrim with similar drapability and lack of shape memory so as to be curved around the edge of a cement board or gypsum wall board. The polyolefin compositions are much more heat stable during manufacturing than PVC plastisol and produce far fewer VOCs. The polyolefin coatings do not contain any plasticizer in the extrusion compositions and will always have the same viscosity and rheology at the same temperature. They also produce no void in the coatings, especially when extruded over individual yarns so as to substantially uniformly coat the entire exterior surface area of the yarn. This enables them to be more corrosion resistant in alkaline environments than in earlier composed fabrics.

Although various embodiments have been illustrated, this is for the purpose of describing, but not limiting, the invention. Various modifications, which will be apparent to one skilled in the art, are within the scope of this invention described in the attached claims.

What is claimed is:

1. A method of making a fabric reinforcement comprising:
   a) providing a plurality of glass yarns;
   b) extruding a substantially uniform thickness of a softened polyolefin based polymeric composition over said glass yarns to form coated glass yarns, the softened polyolefin based polymeric composition comprising:
      i) about 70-80 wt % heterophasic polypropylene copolymer;
      ii) about 10-30 wt % polypropylene homopolymer;
      iii) about 0-5 wt % ethylene-olefin copolymer;
      iv) about 2-4 wt % maleic anhydride-g-polypropylene;
      v) about 0-20 wt % inorganic filler; and
      vi) about 500-1500 ppm vinylidene fluoride-hexafluoroalkene copolymer; and
   c) forming a laid scrim with said coated yarns.

2. The method of claim 1, wherein said laid scrim is drapeable enough to form about a 0.5 inch radius without springing back to its original shape.

3. The method of claim 1, further comprising applying a sizing to the glass yarns, the sizing being selected from the group consisting of:
   1) an epoxy polymer, vinyl and amine coupling agents and a non-ionic surfactant;
   2) an epoxy polymer, amine coupling agent and a non-ionic surfactant;
   3) an epoxy polymer, methacrylic and epoxy coupling agents, and cationic and non-ionic surfactants;
   4) anhydrous polymerized acrylate amine, methacrylic and epoxy coupling agents and a non-ionic surfactant; and
   5) anhydrous polymerized epoxy amine, vinyl and amine coupling agents, and a non-ionic surfactant.

4. The method of claim 1 wherein said fabric reinforcement has a Gurley Stiffness measurement of about 100-3000 mg and an ASTM D 638 (2% Secant) modulus of compression of about 1-100 MPa.

5. The method of claim 1 wherein said inorganic filler comprises talc.

6. The method of claim 1 wherein said ethylene-olefin comprises an ethylene-$\alpha$ olefin.

7. The method of claim 1 wherein said fabric reinforcement has a Gurley Stiffness measurement of about 500-2,500 mg and an ASTM D 638 (2% Secant) modulus of compression of about 5-35 MPa.

8. The method of claim 1, wherein, during step (a), two or more strands twisted together with a first twist are plied with a second twist in order to form a balanced yarn.

9. The method of claim 1, wherein extruding comprises extruding the softened polyolefin based polymeric composition over individual ones of said glass yarns.

10. The method of claim 1, wherein the glass yarns comprise zero twist yarns.

* * * * *